US007010585B2

(12) United States Patent
Asami

(10) Patent No.: US 7,010,585 B2
(45) Date of Patent: Mar. 7, 2006

(54) DNS SERVER, DHCP SERVER, TERMINAL AND COMMUNICATION SYSTEM

(75) Inventor: Tohru Asami, Saitama (JP)

(73) Assignee: DDI Corporation, Tokyo (JP)

( * ) Notice: Subject to any disclaimer, the term of this patent is extended or adjusted under 35 U.S.C. 154(b) by 890 days.

(21) Appl. No.: 09/794,011

(22) Filed: Feb. 28, 2001

(65) Prior Publication Data

US 2001/0023459 A1    Sep. 20, 2001

(30) Foreign Application Priority Data

Mar. 14, 2000  (JP)  ............................. 2000-070370

(51) Int. Cl.
*G06F 15/177*    (2006.01)
(52) U.S. Cl. ...................... 709/220; 709/223; 709/227
(58) Field of Classification Search ......... 709/220–231
See application file for complete search history.

(56) References Cited

U.S. PATENT DOCUMENTS

| 6,026,445 | A * | 2/2000 | Kephart et al. | 709/245 |
| 6,560,642 | B1 * | 5/2003 | Nurmann | 709/220 |
| 6,614,774 | B1 * | 9/2003 | Wang | 370/338 |
| 6,718,535 | B1 * | 4/2004 | Underwood | 717/101 |
| 6,754,706 | B1 * | 6/2004 | Swildens et al. | 709/225 |

FOREIGN PATENT DOCUMENTS

JP    11-122301    4/1999

OTHER PUBLICATIONS

"NT Wizard" vol. 2, Accera Corporation, Aug. 1998, pp. 146-153 (English Summary attached).

* cited by examiner

*Primary Examiner*—Kim Huynh
*Assistant Examiner*—Eron Sorrell
(74) *Attorney, Agent, or Firm*—Westerman, Hattori, Daniels & Adrian, LLP

(57) ABSTRACT

The object of the present invention is to provide a DNS server and terminals both of which are capable of sending and receiving communication by means of a small number of IP addresses. In the case where a firewall is not provided, when the DNS server receives an inquiry of a FQDN, it sends a broad cast frame for searching a terminal to which an IP address is assigned via all the network devices. When a terminal monitors the broad cast frame and finds the FQDN to be its own FQDN, it returns the uni-cast frame to the DNS server. When the DNS server receives the uni-cast frame, it makes a look-up table and a reverse look-up table. As a result, the terminal can receive the communication by an ordinary method. In the case where the firewall is provided, by processing an IP address conversion between the external IP address and the internal address by the use of an IP address conversion means NAT in addition to making the look-up table and the reverse look-up table, the terminal can receive communication.

11 Claims, 8 Drawing Sheets

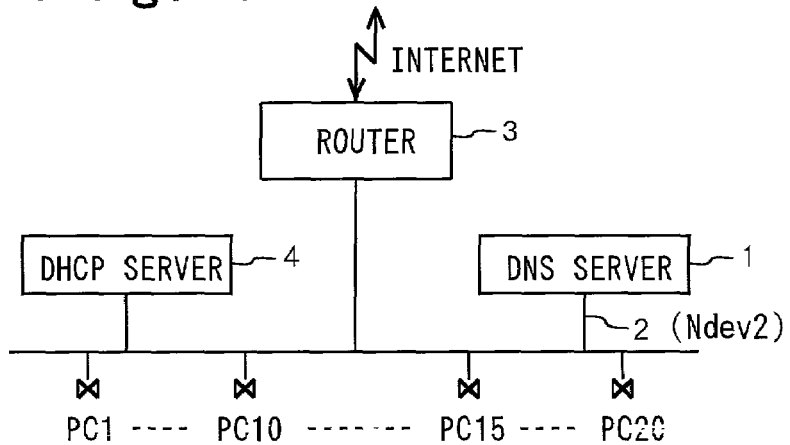
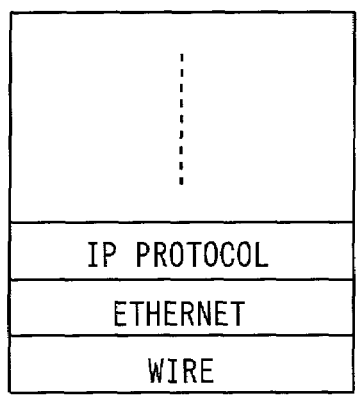

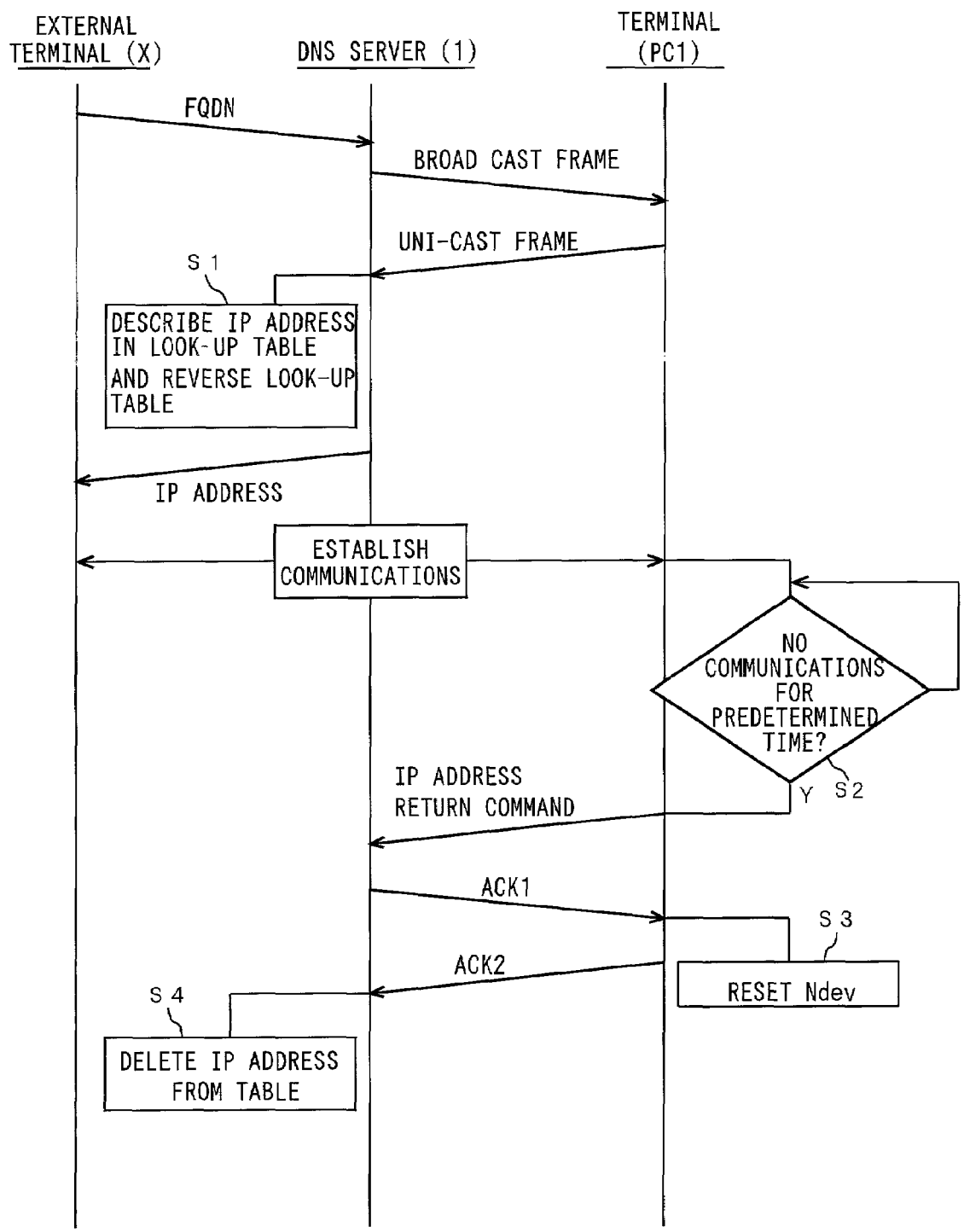

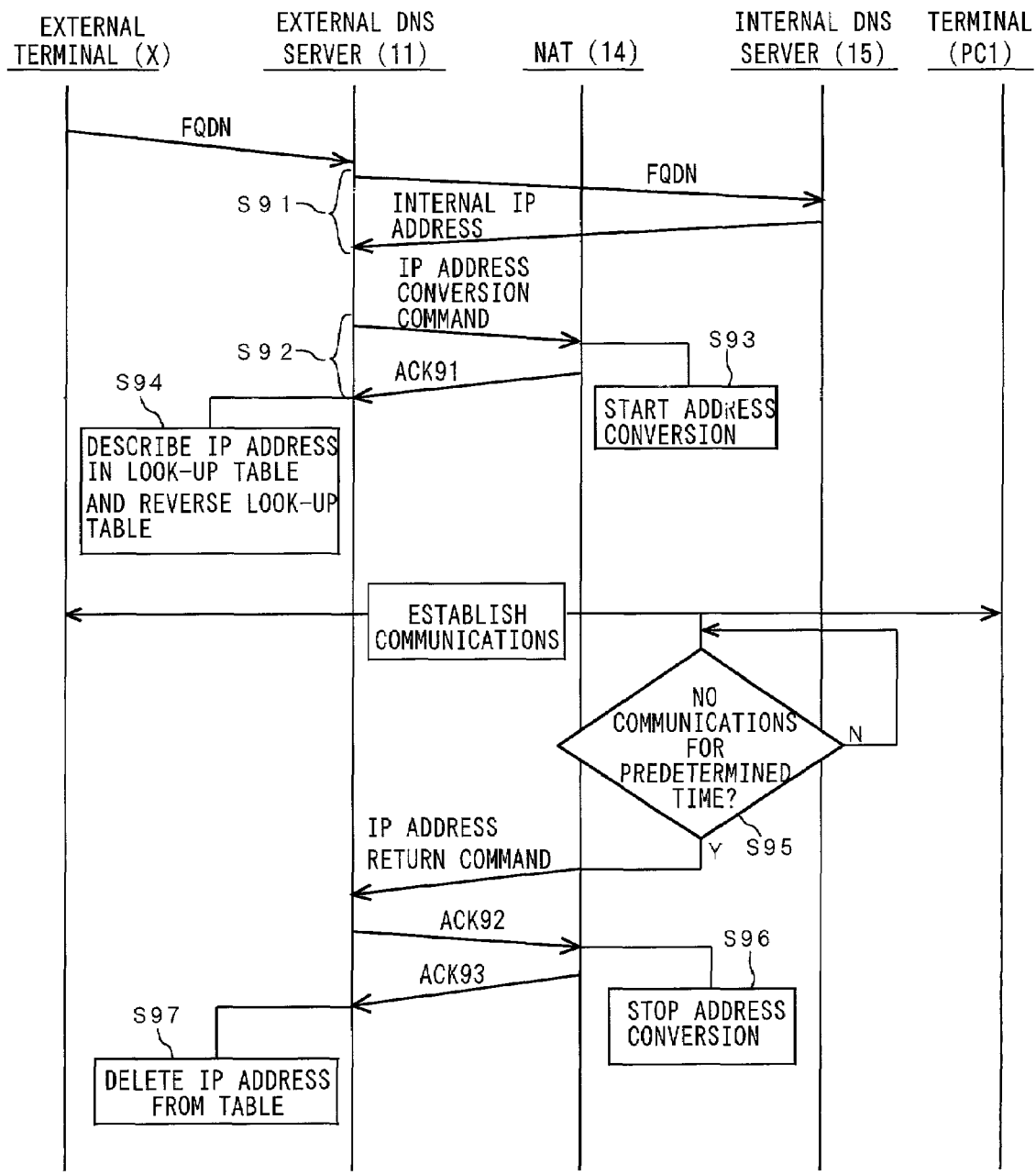

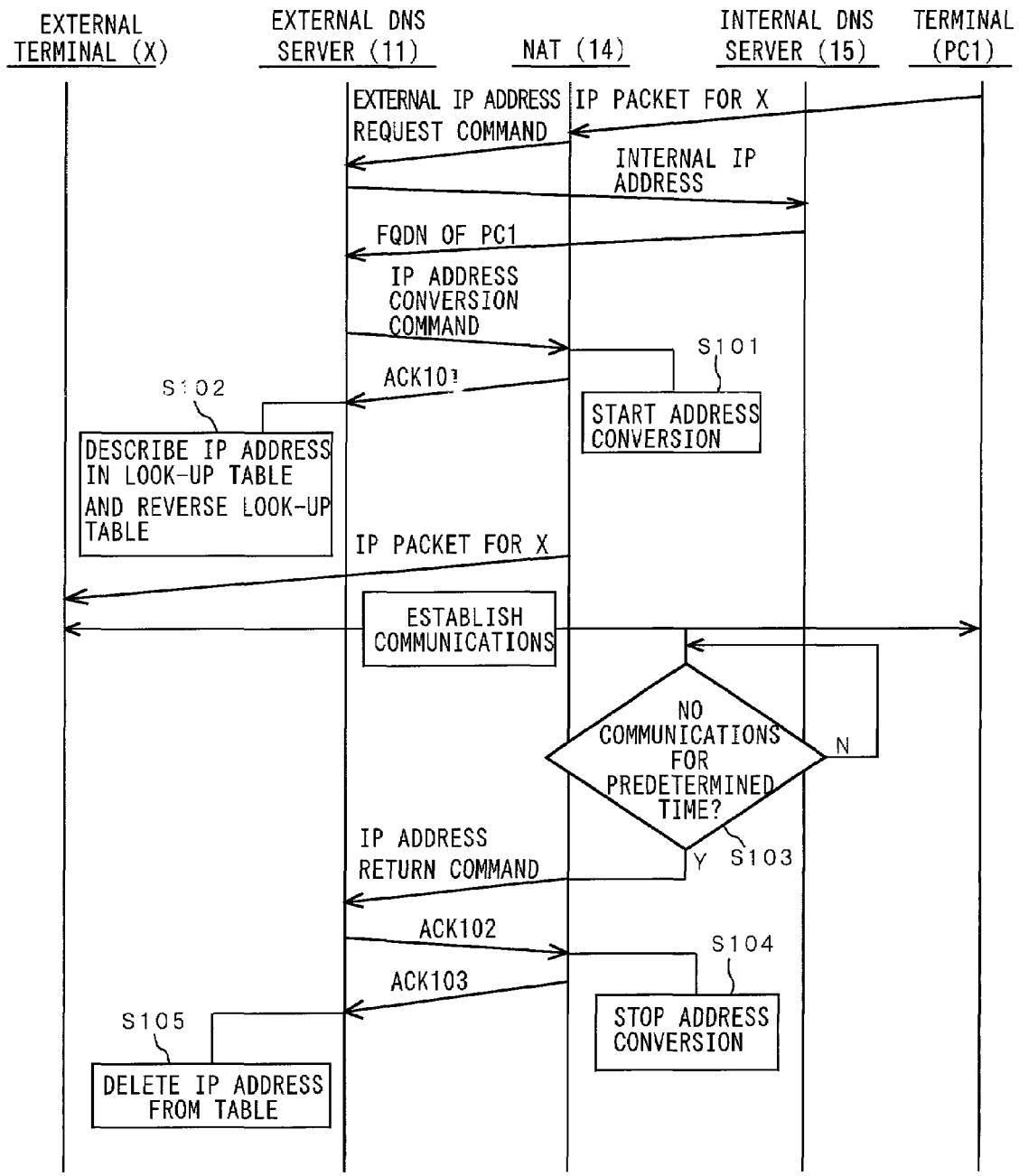

| ↓(INPUT) | ↑(OUTPUT) |
|---|---|
| FQDN | IP ADDRESS |
| pc1.nes.kddlabs.co.jp | 133.128.8.15 |

(LOOK-UP TABLE)

| ↓(INPUT) | ↑(OUTPUT) |
|---|---|
| IP ADDRESS | FQDN |
| 133.128.8.15 | pc1.nes.kdd.labs.co.jp |

(REVERSE LOOK-UP TABLE)

DNS SERVER, DHCP SERVER, TERMINAL AND COMMUNICATION SYSTEM

BACKGROUND OF THE INVENTION

1. Field of the Invention

The present invention relates to a DNS (Domain Name System) server, a DHCP (Dynamic Host Configuration Protocol) server, a terminal and a communication system of an Internet capable of supporting a large number of terminals by means of a small number of IP addresses by dynamically assigning a limited number of IP addresses only to now communicating terminals.

2. Description of the Related Art

Among conventional Internets, as shown in FIG. 11, is a system for connecting a DNS server 50 to a plurality of terminals (personal computer terminals) 52a, 52b, 52c, - - -, 52n through a dedicated line or LAN/MAN 51. Usually, in the DNS server 50 are stored a look-up table for storing FQDNs (fully qualified domain name-host name) as shown in FIG. 12A and a reverse look-up table as shown in FIG. 12B. When a inquiry about a FQDN is made of a DNS server from a terminal (for example, 52a) connected to the DNS server 50 or an external terminal connected to the Internet in the case where the terminal is to be connected to a terminal corresponding to the FQDN, the DNS server 50 finds an IP address from the FQDN with reference to the look-up table, whereby the terminal is connected to the terminal corresponding to the FQDN. In some case, the DNS server 50 finds a FQDN from the IP address with reference to the reverse look-up table.

In the conventional system described above, there is presented a problem that each of the terminals 52a, 52b, 52c, - - -, 52n needs to have an address, which leads to the depletion of the IP addresses managed by the DNS server 50.

In order to solve this problem, for example, a system employing the DHCP server 60 shown in FIG. 13 is proposed. The DHCP server 60 has a function of assigning an IP address and is connected to, for example, a public exchange network 61 through 10 lines and the public exchange network 61 is connected to, for example, 100 terminals 62a to 62n. Usually, each of the terminals 62a to 62n is not assigned an IP addresses and when the terminal sends IP communications, it requires the DHCP server 60 to assign an IP address thereto and is assigned the IP address by the DHCP server 60.

For example, when a terminal 62a is going to conduct the IP communications, the DHCP server 60 assigns an IP address to the terminal 62a. As a result, the terminal 62a can start conducting the IP communications with the other terminals. When the terminal does not conduct the IP communications even after a predetermined time elapses after the completion of this communications, the terminal 62a returns the IP address to the DHCP server 60 and returns to the initial state where it has no IP address.

According to this conventional system, it is essential only that the DHCP server 60 assigns the IP address to the terminal which requires the IP communications every time it requires the IP communications, and hence the DHCP server 60 can manage the terminals 62a to 62n with a small number of IP addresses. Also, this can save the number of ports of the DHCP server 60.

In the conventional system described above, however, an IP address is not previously assigned to each of the terminals 62a to 62n, and hence the terminals 62a to 62n can not receive communication. In other words, the conventional system has a problem that it is designed specifically for sending communication.

SUMMARY OF THE INVENTION

The object of the present invention is to provide a DNS server, a DHCP server, a terminal and a communication system which can send and receive communication by means of a small number of IP addresses.

In order to achieve the object, the present invention is firstly characterized in that a DNS server comprises means for holding a table in which FQDNs of terminals managed by the DNS server are registered in advance and the list of IP addresses to be broad cast to the outside; address conversion means for converting one of the IP addresses in the list to be broad cast to the outside into one of an address of a data link layer and a network layer in the sense of OSI communications between the terminals managed by the DNS server, when the DNS server receives an inquiry of the FQDN; and registration means for registering the IP addresses in the table in correspondence with the FQDNs, wherein the terminal required to receive communication can receive it. According to the invention, in the case where a fire wall is not provided, the terminal can receive communications through an Internet from the external terminal.

The present invention is secondly characterized in that a communication system comprises an external DNS server provided on a fire wall for managing a correspondence relationship between the FQDN and the IP address of a terminal both of which are to be broad cast to the outside; IP address conversion means NAT provided on the fire wall: and an internal DNS server provided in the fire wall and for managing a correspondence relationship between the FQDN and the IP address of a terminal, both of which are used in the fire wall, wherein when there is an inquiry from inside the fire wall, the internal DNS server returns an IP address found from the correspondences relationship between the FQDN and the IP address of a terminal, both of which are used in the fire wall, wherein when there is an inquiry from outside the fire wall, the external DNS server inquires of the internal DNS server an internal IP address corresponding to the FQDN and corresponds one of the IP addresses in the external broad cast list to the internal IP address of the terminal and registers the external IP address in correspondence with the FQDN, and wherein the IP address conversion means NAT converts an IP address (external IP address) destination of a packet passing the fire wall from outside to inside into the internal IP address, and a source IP address (internal IP address) of a packet passing the fire wall from inside to outside into the IP address of the NAT. According to the invention, in the case where the fire wall is provided, the terminal can receive communication from the external terminal.

According to the first and second feature of the invention, IP address are dynamically assigned only to now communicating terminals. Therefore, this makes it possible to eliminate a problem of depletion of the IP address managed by the DNS server and to make the terminal receive and send communication.

The present invention is thirdly characterized in that a terminal corresponding to the FQDN of a broad cast frame sent by the DNS server initializes a network device receiving the broad cast frame by the IP address and the net mask given by the broad cast frame. According to the invention, the terminal which is required of receiving is dynamically assigned IP address and can receive communication.

BRIEF DESCRIPTION OF THE DRAWINGS

FIG. 1 is a circuit diagram to show the schematic system configuration of one preferred embodiment, in the case where a fire wall is not provided, in accordance with the present invention;

FIG. 2 is a conceptional view of a look-up table formed in a DNS server;

FIG. 3 is an illustration of a hierarchical structure of LAN communications;

FIG. 6 is a timing chart to show a communication receiving operation of one preferred embodiment in the case where a fire wall is not provided;

FIG. 9 is a timing chart to show a communication receiving operation of one preferred embodiment in the case where a fire wall is provided;

FIG. 10 is a timing chart to show a communication sending operation of one preferred embodiment in the case where a fire wall is provided;

DETAILED DESCRIPTION OF THE PREFERRED EMBODIMENT

Figure 4:
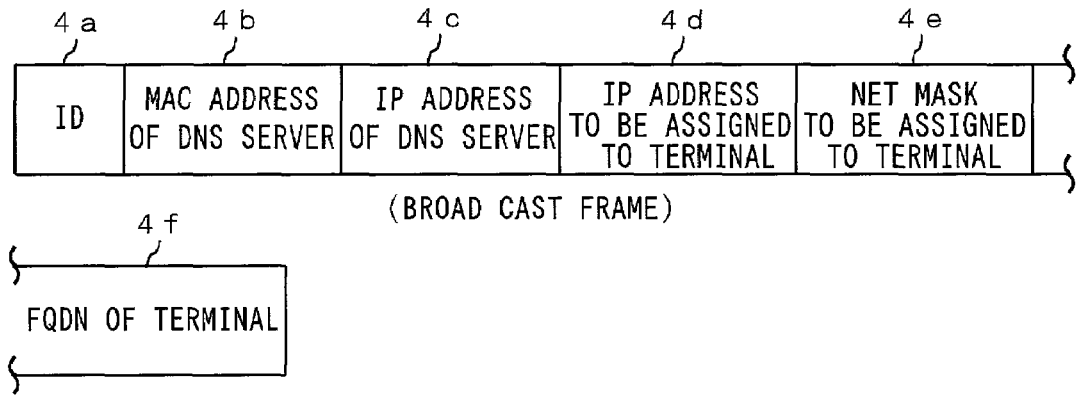
FIG. 4 is an illustration of one example of a broad cast frame.

The present invention will be hereinafter described in detail with reference to the accompanying drawings. FIG. 1 to FIG. 7 show one preferred embodiment in accordance with the present invention in the case where a fire wall is not provided between terminals and an Internet, which is typified by a dial-up service of a provider.

As shown in FIG. 1, assume that the DNS server 1 of the present embodiment is connected to terminals (for example, personal computer) pc1, pc10, pc15, pc20 and the like and a DHCP server 4 through a network LAN 2, for example, and that the LAN 2 is connected to an Internet through a router 3. Also, assume that FQDNs are previously assigned to the terminals pc1, pc10, pc15, pc20 and the like. Further, assume that each of these terminals pc1 to pc20 always gets a system up and running, which monitors the broad cast frame (for example, the broad cast frame of an Ethernet) of a data link layer of a network device Ndev connected to a network and detects a broad cast frame having a specific protocol ID for assigning an IP address described below.

FIG. 2 shows one example of a look-up table formed in the DNS server 1, and in this look-up table 5 are stored the FQDNs of the terminals connected to the LAN 2, wherein IP addresses corresponding to the respective FQDNs are not determined. Also, in the DNS server 1 are stored a set of available IP addresses and a set of not-yet-used IP addresses. Further, as shown in FIG. 3, in the LAN 2 is used an IP protocol on an Ethernet. Here, FIG. 3 is an illustration of a hierarchical structure of the communications of the LAN 2.

An operation when the terminal pc1 receives communication in the above system, for example, will be described with reference to FIG. 1, FIG. 4 to FIG. 6. Here, FIG. 4 is a system configuration of a broad cast frame, FIG. 5 is a system configuration of a uni-cast frame, and FIG. 6 is a timing chart to show the outline of an operation of the present embodiment.

Now, as shown in FIG. 6, assume that an inquiry about the FQDN, for example, "pc1.ncs.kddlabs.co.jp", of a terminal pc1 in the domain managed by the DNS server 1 is made of the DNS server 1 through an Internet from an external terminal X, the DNS server 1 searches a not-yet-used IP address and if there is not an unassigned IP address, the DNS server 1 answers that there is not a terminal to the inquiry to thereby keep conformity in the ordinary protocol with respect to the DNS server.

On the other hand, if there is a not-yet-used IP address, the DNS server 1 sends a broad cast frame for searching a terminal, to which an IP address is to be assigned, by the standards of Ethernet, through all of the network devices Ndev (for example, Ndev 2 in FIG. 1) connected to the DNS server 1. In this broad cast frame, as shown in FIG. 4, are included an ID 4a to identify a frame relating to this protocol, the MAC address 4b of DNS server 1 from which communication is sent, an IP address 4c of the DNS server 1 from which communication is sent, an IP address 4d to be assigned to the terminal pc1, a net mask 4e to be assigned to the terminal pc1, and the FQDN 4f of the terminal pc1.

Figure 5:
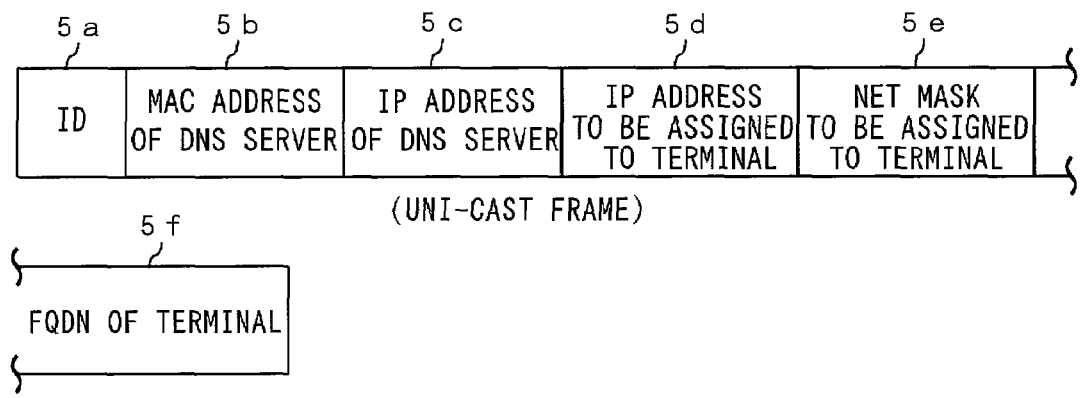
FIG. 5 is an illustration of one example of a uni-cast frame.

When the broad cast frame in FIG. 4 is sent from the DNS server 1, the terminal pc1, for example, to which "pc1.nes.kddlabs.co.jp" is assigned, answers to this and initializes the network device Ndev receiving the broad cast frame by the assigned IP address 4d and the net mask 4e. Thereafter, the terminal pc1 returns a uni-cast frame including the following information to the MAC address 4b of the DNS server 1 from which the broad cast frame in FIG. 4 is sent. That is, the terminal pc1 assigns the above-mentioned IP address 4d to itself and returns the uni-cast frame, which is an ACK signal, to the address 4b which receives the uni-cast frame, that is, to the DNS server 1.

In the above-mentioned uni-cast frame, as shown in FIG. 5, are included ID 5a to identify a frame relating to this protocol, the MAC address 5b of the DNS server 1, an IP address 5c of the DNS server 1, an IP address 5d to be assigned to the terminal pc1, a net mask 5e to be assigned to the terminal pc1, and the FQDN 5f of the terminal pc1.

When the DNS server 1 receives this uni-cast frame, it describes the assigned IP address, for example, "133.128.8.15" in the IP address column, to which an IP address has been not yet assigned, of the look-up table 5 (see FIG. 2) and makes a reverse look-up table (not shown) at the same time (see step S1 in FIG. 6), and thereafter functions as an ordinary DNS server. That is, since the IP address is assigned to the communication receiving terminal pc1, the communication sending terminal establishes and conducts communications with the terminal pc1 by the ordinary procedure.

Next, the terminal pc1 monitors the state of itself after the communications start (S2) and when the terminal pc1 detects that the terminal pc1 is not used for 15 minutes, for example, the terminal pc1 sends an IP address return command (UDP packet) for returning the assigned IP address to the DNS sever 1. When the DNS server 1 receives the IP address return command, it returns a signal ACK 1 to the terminal pc1. When the terminal pc1 receives the ACK 1, it returns a signal ACK 2 to the DNS server 1 and resets the network device Ndev corresponding thereto (S3). Here, when the terminal pc1 does not receive the above-mentioned ACK 1 within a predetermined period after it sends the IP address return command, it sends the IP address return command to the DNS server 1 once more.

When the DNS server 1 receives the above-mentioned ACK 2, it deletes the IP address assigned to the terminal pc1 from the look-up table 5 and the reverse look-up table (S4) and registers the IP address once more in a set of not-yet-used IP addresses.

In this manner, according to the present embodiment, it is possible to receive communications through the Internet from the external terminal.

Figure 7:
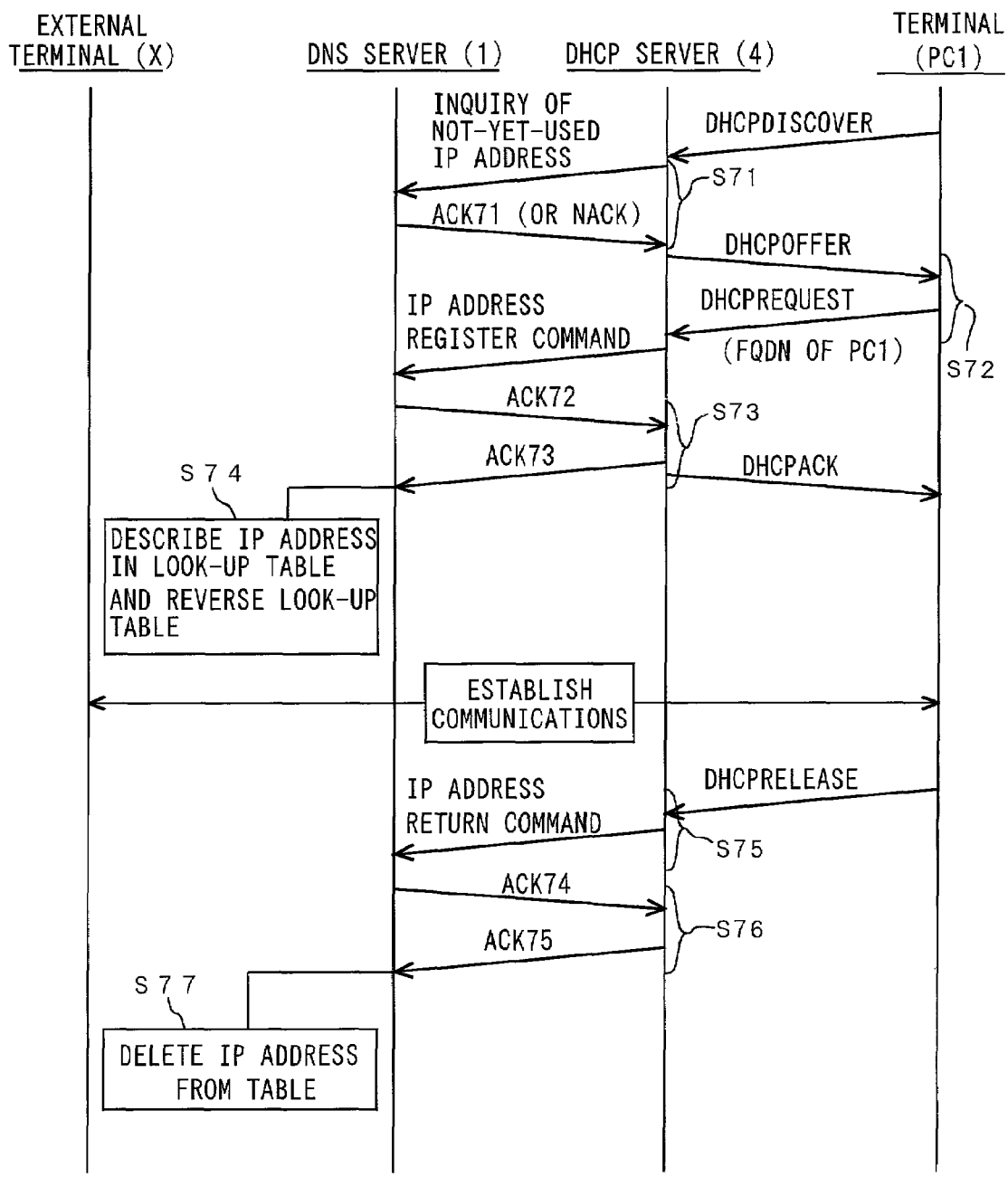
FIG. 7 is a timing chart to show a communication sending operation of one preferred embodiment in the case where a fire wall is not provided.
Figures 11, 12A, 12B:
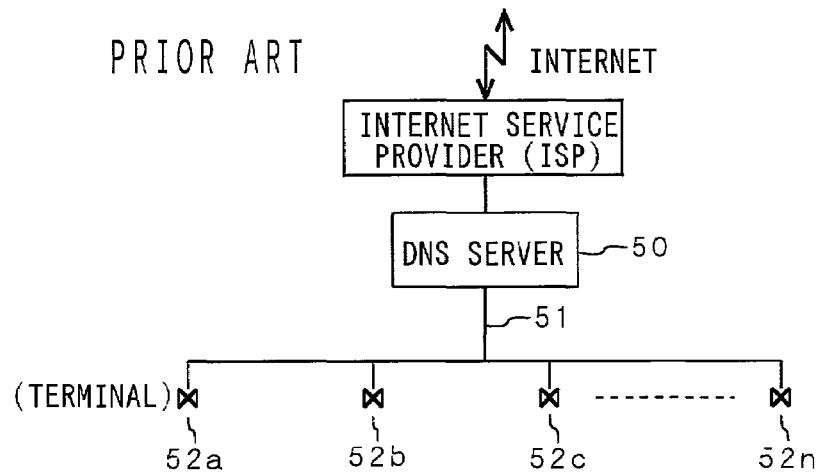
FIG. 11 is a circuit diagram to show a conventional system configuration.
FIG. 12A is a conceptional view of a look-up table and FIG. 12B is a conceptional view of a reverse look-up table.
Figure 13:
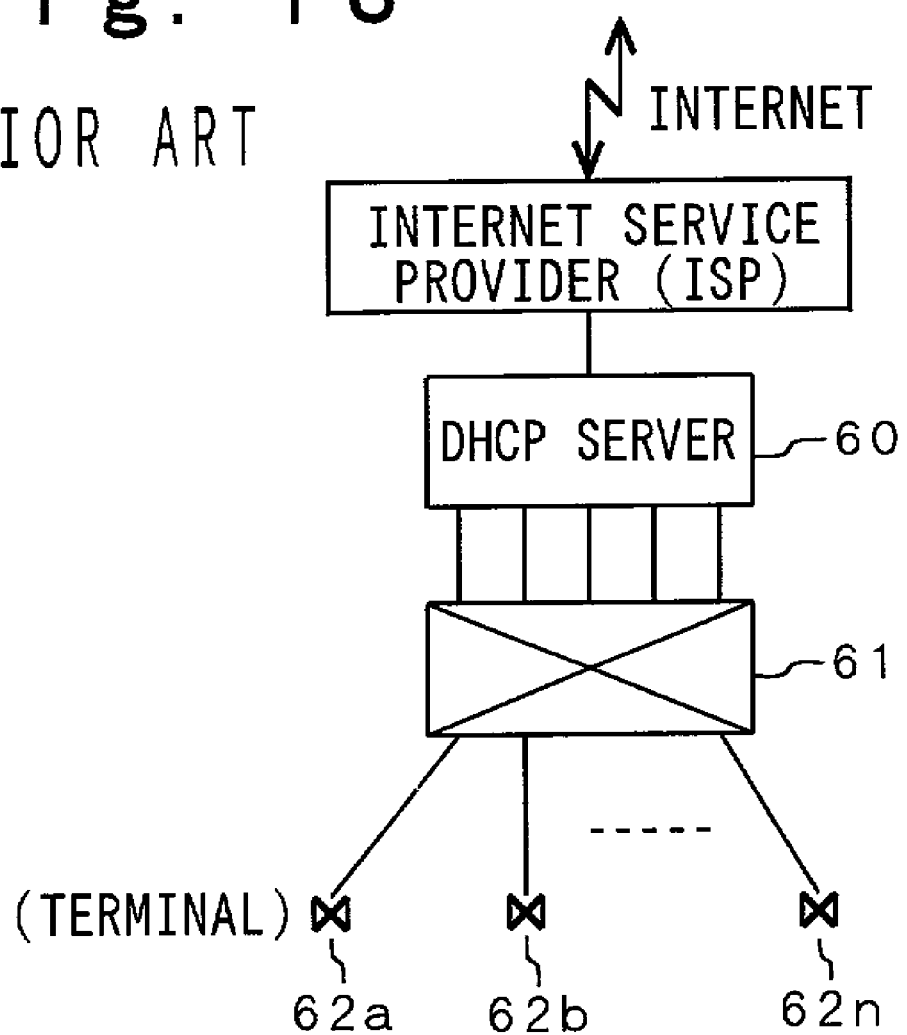
FIG. 13 is a circuit diagram to show another conventional system configuration.

In this connection, the difference between the case where the terminal pc1 sends communication, for example, in the above-mentioned system and the conventional DHCP server will be described with reference to FIG. 1, FIG. 2 and FIG. 7. Here, FIG. 7 is a timing chart to show the outline of the operation of the present embodiment. The operation between the terminal pc1 and the like and the DHCP server 4 is similar to that with respect to the conventional DHCP server described in a RFC1541 and hence its detailed description will be omitted.

When the terminal pc1 sends a signal DHCPDISCOVER, the DHCP server 4 receiving the signal DHCPDISCOVER asks the DNS server 1 whether the DNS server 1 has a not-yet-used IP address or not in the state where it determines the setting of the terminal (S71). If the DNS server 1 has an unassigned IP address, it returns a signal ACK 71 to this inquiry to the DHCP server 4 and the DHCP server 4 returns a signal DHCPOFFER to the terminal pc1 by the use of the IP address assigned by the DNS server 1. When the terminal pc1 selects the assigned setting information (S72), it puts the FQDN previously set to itself in the Host Name Option of a DHCPREQUEST and returns the DHCPREQUEST to the DHCP server 4. The DHCP server 4 receiving the DHCPREQUEST sends an IP address register command to register the relationship between the IP address and the FQDN. When the DNS server 1 receives the IP address register command, it returns a signal ACK 72 to the DHCP server 4. When the DHCP server 4 receives the ACK 72, it returns a signal ACK 73 to the DNS server 1 and returns the corresponding terminal setting DHCPACK to the terminal pc1 (S73). Here, when the DHCP server 4 does not receive the above-mentioned ACK 72 within a predetermined time after it sends the above-mentioned IP address register command, it sends the IP address register command to the DNS server 1 once more.

When the DNS server 1 receives the above-mentioned ACK 73, it describes the assigned IP address, for example, "133.128.8.15" in the IP address column, which is not yet used, of the look-up table 5 (FIG. 2) and makes a reverse look-up table (not shown) at the same time (S74) and thereafter functions as an ordinary DNS server. That is, since the IP address is assigned to the terminal pc1, which is the communication sending terminal, the communication sending terminal can establish and conduct communications with the terminal pc1 by the ordinary procedure.

Next, after the communications start, when the DHCP server 4 receives a request of returning the IP address by DHCPRELEASE from the terminal pc1 (S75), the DHCP server 4 sends an IP address return command (UDP packet) for returning the IP address assigned to the pc1 to the DNS server 1. When the DNS server 1 receives the IP address return command, it returns a signal ACK 74 to the DHCP server 4. When the DHCP server 4 receives the ACK 74, it returns a signal ACK 75 to the DNS server 1 (S76). Here, when the DHCP server 4 does not receive the ACK 74 within a predetermined time after it sends the IP address return command, it sends the IP address return command to the DNS server 1 once more.

When the DNS server 1 receives the ACK 75, it deletes the IP address assigned to the terminal pc1 from the look-up table 5 and the reverse look-up table (S77) and registers the IP address in a set of unassigned IP addresses.

In this connection, by entering 0 for the existing time (TTL) of the data when the DNS server 1 registers an external IP address corresponding to the FQDN in the table, it is possible to prevent a DNS server on an external Internet from caching the registered information of the FQDN and the IP address.

Figure 8:
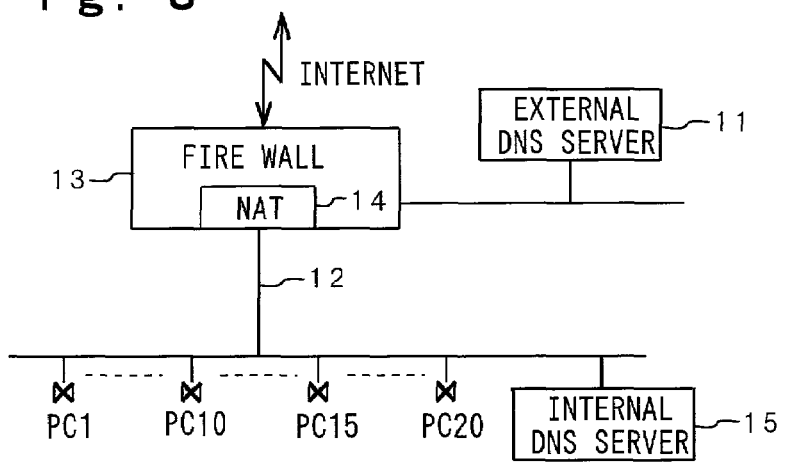
FIG. 8 is a circuit diagram to show a schematic system configuration of one preferred embodiment in the case where a fire wall is provided.

Next, the preferred embodiment in accordance with the present invention in the case where a fire wall 13 is provided between the terminals and the Internet such as a corporate LAN will be described in detail in the following. FIG. 8 is a block diagram to show the schematic system configuration of one preferred embodiment in accordance with the present invention, FIG. 9 is a timing chart to show a communication receiving operation, and FIG. 10 is a timing chart to show a communication sending operation.

As shown in FIG. 8, assume that the external DNS server 11 of the present embodiment is connected to an Internet and an internal network, for example, a LAN 12 via a fire wall 13. Assume that the terminals (for example, personal computers) pc1, pc10, pc15, pc20, and the like, and an internal DNS server 15 are connected to the LAN 12 to establish mutual communications with an Internet outside the fire wall by means of a network address translator (NAT) 14. Assume that the FQDNs of the terminals pc1, pc10, pc15, pc20, and the like are assigned in advance to the external DNS server 11. Assume that internal IP addresses (private addresses) as well as the FQDNs of the terminals pc1, pc10, pc15, pc20, and the like are already registered in the internal DNS server 15 for managing mutual communications between the terminals in the internal network and that, in the communications in the internal LAN, it is possible to refer to the internal IP address from the FQDN and the FQDN from the internal IP address by means of the internal DNS server 15.

FIG. 2 shows one example of a look-up table formed in the external DNS server 11 and, in this look-up table 5, FQDNs connected to the LAN 12 are registered and IP addresses corresponding to the FQDNs are not determined. Also, in the external DNS server 11 are registered a set of available IP addresses and a set of now not-yet-used IP addresses.

The operation when the terminal pc1 receives communication in the above-mentioned system, for example, will be described with reference to FIG. 8 and FIG. 9.

Now, as shown in FIG. 9, when an external terminal X asks an external DNS server 11, via an Internet, about the FQDN of the terminal pc1 of the domain managed by the external DNS server 11, for example "pc1.nes.kddlabs.co.jp", the external DNS server 11 searches an not-yet-used IP address and if it does not find an not-yet-used IP address, it answers the external terminal X that there is no terminal corresponding to the inquiry, whereby conformity on the protocol to the ordinary DNS server can be held.

On the other hand, if there is an not-yet-used IP address, the external DNS sever 11 asks the internal DNS server 15 about the internal IP address corresponding to the FQDN (see a step S91 in FIG. 9). If the internal DNS server 15 does not find the internal IP address corresponding thereto, it answers the external DNS server 11 that there is no terminal corresponding to the inquiry, whereby conformity on the protocol to the ordinary DNS server can be held.

If the external DNS server 11 receives the corresponding internal IP address from the internal DNS server 15, it sends an IP address conversion command to a network address translator (NAT) 14 to direct the address conversion between the external IP address, which is to be newly selected and assigned from among not-yet-used IP addresses, for example, "133.128.8.15", and the internal IP address (S92). When the NAT 14 receives the IP address conversion command, it starts address conversion between the directed external and internal IP addresses (S93) and returns a signal ACK 91 to the external DNS server 11. When the external DNS server receives the ACK 91, it describes the external IP address in the IP address column, which is not yet determined, of the look-up table 5 (FIG. 2) and makes a reverse look-up table (not shown) at the same time (S94) and thereafter functions as an ordinary DNS server. That is, since the external IP address of the fire wall is assigned to the terminal pc1, which is the communication receiving terminal, a communication sending terminal outside the fire wall can establish and conduct communications with the terminal pc1 by the ordinary procedure.

Next, after the communications start, the NAT 14 monitors the state of the communications between the terminals subjected to the address conversion (S95), and when it finds that the NAT 14 is disconnected from the terminal, it sends an IP address return command for returning the external IP address to the external DNS server 11. When the external DNS server 11 receives the IP address return command, it returns a signal ACK 92 to the NAT 14. When the NAT 14 receives the ACK 92, it returns a signal ACK 93 to the external DNS server 11 to stop the address conversion to the corresponding external IP address (S96). Here, when the NAT 14 does not receive the ACK 92 within a predetermined time after it sends the IP address return command, it sends the IP address return command to the external DNS server 11 once more.

When the external DNS server 11 receives the ACK 93, it deletes the IP address assigned to the terminal pc1 from the look-up table 5 and the reverse look-up table (see step S97 in FIG. 9) and registers the IP address again in the set of not-yet-used IP addresses.

Next, the operation when the terminal pc1 sends communication in the above-mentioned system, for example, will be described with reference to FIG. 8 and FIG. 10.

For example, when the terminal pc1 sends communication, the terminal pc1 outputs an IP packet for an external terminal X. The NAT 14, unlike the conventional NAT 14, outputs an external IP address request command including the internal IP address of the terminal pc1 to the external DNS server 11 every time it receives the IP packet for the external terminal X. When the external DNS server 11 receives the external IP address request command, it searches an not-yet-used IP address and if it does not find the not-yet-used IP address, it returns non-permission of the address conversion (NACK) to the NAT 14. When the NAT 14 receives the NACK, it does not permit the terminal pc1 to be connected to an external terminal.

On the other hand, if the external DNS server 11 finds the not-yet-used IP address, it asks the internal DNS server 15 about the FQDN corresponding to the internal IP address and gets the FQDN. When the internal DNS server 15 does not succeed in getting the FQDN, it returns the non-permission of the address conversion (NACK). On the other hand, when the internal DNS server 15 succeeds in getting the FQDN, it sends the gotten FQDN of the terminal pc1 to the external DNS server 11. The external DNS server 11 returns to the NAT 14 an IP address conversion command for directing the address conversion between the external IP address to be newly selected and assigned from among the not-yet-used IP addresses, for example, "133.128.8.15", and the internal IP address. When the NAT 14 receives the IP address conversion command, it starts the mutual IP address conversion between the directed IP addresses (S101) and returns a signal ACK 101 to the external DNS server 11. When the external DNS server 11 receives the ACK 101, it describes the external IP address in the IP address column, which is not yet determined, of the look-up table 5 (see FIG. 2) and makes a reverse look-up table (not shown) at the same time (S102). That is, since the external IP address of the fire wall is assigned to the terminal pc1, which is the communication sending terminal, the terminal pc1 can establish and conduct communications with a communication receiving terminal outside the fire wall by the ordinary procedure.

Next, after the communications start, the NAT 14 monitors the state of the communications between the terminals subjected to the address conversion (S103), and when it finds that the NAT 14 is disconnected from the terminal, it sends an IP address return command for returning the external IP address to the external DNS server 11. When the external DNS server 11 receives the IP address return command, it returns a signal ACK 102 to the NAT 14. When the NAT 14 receives the ACK 102, it returns ACK 103 to the external DNS server 11 to stop the address conversion to the corresponding external IP address (S104). Here, when the NAT 14 does not receive the ACK 102 within a predetermined time after it sends the IP address return command, it sends the IP address return command to the external DNS server 11 once more.

When the external DNS server 11 receives the ACK 103, it deletes the IP address assigned to the terminal pc1 from the look-up table and the reverse look-up table (S105) and registers the IP address again in the set of not-yet-used IP addresses.

In this connection, by entering 0 for the existing time (TTL) of the data when the DNS server 11 registers an external IP address corresponding to the FQDN in the table, it is possible to prevent a DNS server on an external Internet from caching the registered information of the FQDN and the external IP address.

As described above, according to the present embodiment, it is possible not only to send communication from one terminal to the other terminal to establish communications between them but also to receive communication sent from the other terminal.

In this connection, while the present invention has been described by the use of the system in which the DNS server is connected to the terminals by means of the LAN in the above-mentioned embodiment, it is not intended to limit the present invention to this embodiment, but it can be also applied to a system in which a DNS server is connected to terminals by means of a public telephone line, a dedicated line, or the like.

As is evident from the above description, when the DNS server in accordance with the present invention receives an inquiry of a FQDN from an external Internet terminal, in the case where a fire wall is not provided, it sends a broad cast frame for searching a terminal to which an IP address is assigned via all network devices connected to the DNS server, and when it receives an answer to the broad cast frame, it registers an external IP address in correspondence with the FQDN in a look-up table and a reverse look-up table. On the other hand, in the case where the fire wall is provided, the DNS server in accordance with the present invention gets the internal IP address (private address) corresponding to the FQDN from an internal DNS server and directs the address conversion between the external IP address and the internal IP address to a NAT and then registers the external IP address in the look-up table and the reverse look-up table in correspondence with the FQDN. Therefore, this makes it possible to eliminate a problem of depletion of the IP addresses managed by the DNS server and to make the terminal receive communication.

Further, when an internal terminal sends communication to an external Internet, in the case where a fire wall is not provided, a DHCP server requires a DNS server to permit an address assignment, while in the case where the fire wall is provided, a NAT requires the DNS server to permit the address assignment. Therefore, this makes it possible to realize the present invention without largely changing the existing DHCP or NAT.

Still further, in the case where the fire wall is not provided, a terminal corresponding to the FQDN of the broad cast frame sent by the DNS server is temporarily assigned an IP address by the DNS server and hence, when it receives communication, it can receive the communication by an ordinary procedure.

What is claimed is:

1. A DNS server to dynamically assign an IP address only to a terminal which is now conducting communications, the DNS server comprising:
   means for holding a table in which FQDNs of terminals managed by the DNS server are registered in advance and a list of IP addresses to be broad cast to the terminals managed by the DNS server;
   address conversion means for converting an IP address in the list of IP addresses to be broad cast to the terminals managed by the DNS server into one of an address of a data link layer and a network layer in the sense of OSI communications between the terminals managed by the DNS server, when the DNS server receives an inquiry of an FQDN; and
   registration means for registering the IP addresses in the table in correspondence with the FQDNs, wherein a terminal required to receive communication can receive it.

2. A DNS server as set forth in claim 1, wherein the table includes a look-up table and a reverse look-up table.

3. A DNS server as set forth in claim 1, wherein when the DNS server receives an inquiry of the FQDN, the address conversion means sends a broad cast frame for searching a terminal to which the IP address is to be assigned and when it has an answer to the broad cast frame, it determines to register the IP address in correspondence with the FQDN.

4. A DNS server as set forth in claim 3, wherein the broad cast frame sent by the address conversion means includes at least an IP address to be assigned to the terminal, a net mask to be assigned to the terminal, and the FQDN of the terminal.

5. A domain name server system to dynamically assign an IP address to a terminal, comprising:
   a domain name server to send a broad cast frame including an FQDN; and
   a network device corresponding to the FQDN of the broad cast frame, wherein the network device receives the broad cast frame sent by the domain name server, determines whether it corresponds to the FQDN, and initializes itself with an IP address and a net mask given by the broad cast frame in response to determining it corresponds to the FQDN.

6. A domain name server system as set forth in claim 5, wherein the terminal sends an IP address return command to the domain name server when there are no communications for a previously predetermined time.

7. A communication system comprising:
   an external DNS server provided on a fire wall for managing a correspondence relationship between a FQDN and an IP address of a terminal, both of which are to be broad cast to the outside of the fire wall;
   IP address conversion means NAT provided on the fire wall; and
   an internal DNS server provided in the fire wall and for managing a correspondence relationship between the FQDN and the IP address of the terminal, both of which are used in the fire wall,
   wherein when there is an inquiry from inside the fire wall, the internal DNS server returns an IP address found from the correspondences relationship between the FQDN and the IP address of a terminal, both of which are used in the fire wall,
   wherein when there is an inquiry from outside the fire wall, the external DNS server inquires of the internal DNS server an internal IP address corresponding to the FQDN and corresponds one of the IP addresses in an external broad cast list to an internal IP address of the terminal and registers an external IP address in correspondence with the FQDN, and
   wherein the IP address conversion means NAT converts a destination IP address (external IP address) of a packet passing the firewall from outside to inside into the internal IP address, and a source IP address (internal IP address) of a packet passing the fire wall from inside to outside into the IP address of the NAT.

8. A communication system as set forth in claim 7, wherein when there is no communications for a predetermined time, the IP address conversion means sends an IP address return command to the external DNS server and deletes the external IP address corresponding to the FQDN and stops processing the IP address conversion.

9. A communication system as set forth in claim 7, wherein when the NAT receives a communication sending packet from an internal terminal, the external DNS server receives an external IP address request and when it receives the external IP address request, it asks the internal DNS server and gets the FQDN corresponding to the internal IP address of the terminal and registers the external IP address corresponding to the FQDN and directs the NAT to process the IP address conversion between the external IP address and the internal IP address.

10. A communication system as set forth in claim 7, further comprising means for holding a table in which the FQDNs of the terminals to be managed by the external DNS server are registered in advance and the list of IP addresses to be broad cast to the outside, wherein the table includes a look-up table and a reverse look-up table.

11. A communication system as set forth in claim 9, wherein when the external DNS server registers the external IP address corresponding to the FQDN in the table, it prevents an DNS server on an external Internet from caching the registered information of the FQDN and the external IP address.

* * * * *